(12) United States Patent
Li et al.

(10) Patent No.: US 11,641,075 B2
(45) Date of Patent: May 2, 2023

(54) PLUG, INTERFACE DEVICE AND IDENTIFICATION METHOD THEREOF

(71) Applicant: BOE TECHNOLOGY GROUP CO., LTD., Beijing (CN)

(72) Inventors: Liang Li, Beijing (CN); Zhigang Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 694 days.

(21) Appl. No.: 16/604,308

(22) PCT Filed: Apr. 17, 2019

(86) PCT No.: PCT/CN2019/083094
§ 371 (c)(1),
(2) Date: Oct. 10, 2019

(87) PCT Pub. No.: WO2019/206011
PCT Pub. Date: Oct. 31, 2019

(65) Prior Publication Data
US 2021/0367387 A1    Nov. 25, 2021

(30) Foreign Application Priority Data
Apr. 26, 2018 (CN) .......................... 201810389332.1

(51) Int. Cl.
*H01R 13/24*    (2006.01)
*H01R 27/00*    (2006.01)
(Continued)

(52) U.S. Cl.
CPC ......... *H01R 27/00* (2013.01); *G06F 13/4068* (2013.01); *H01R 13/193* (2013.01);
(Continued)

(58) Field of Classification Search
CPC ........ H01R 12/00; H01R 12/70; H01R 12/91; H01R 13/00; H01R 13/02; H01R 13/04;
(Continued)

(56) References Cited

U.S. PATENT DOCUMENTS 10,490,944 B2 * 11/2019 Ju .................. H01R 13/646

FOREIGN PATENT DOCUMENTS

| CN | 201349069 Y | 11/2009 |
| CN | 20158474 U | 7/2010 |

(Continued)

OTHER PUBLICATIONS

First Office Action issued by the Chinese Patent Office in the priority Chinese application No. 201810389332.1 dated May 24, 2019 and its English translation.

*Primary Examiner* — Ross N Gushi
(74) *Attorney, Agent, or Firm* — Dilworth & Barrese, LLP.; Michael J. Musella, Esq.

(57) ABSTRACT

The embodiments of the present disclosure provide a plug, an interface device and an identification method thereof. The plug includes at least one insulating pin row including a plurality of insulating pins, a conductive pin which is stretchable and retractable along an axis direction is provided on at least one side of a central line of each of the at least one insulating pin row, and the conductive pin is arranged between two adjacent insulating pins of the plurality of insulating pins.

19 Claims, 6 Drawing Sheets

(51) Int. Cl.
*G06F 13/40* (2006.01)
*H01R 13/193* (2006.01)
*H01R 13/26* (2006.01)
*H01R 13/40* (2006.01)
*H01R 13/66* (2006.01)
*H01R 13/70* (2006.01)

(52) U.S. Cl.
CPC ............ *H01R 13/24* (2013.01); *H01R 13/26* (2013.01); *H01R 13/40* (2013.01); *H01R 13/6683* (2013.01); *H01R 13/70* (2013.01)

(58) Field of Classification Search
CPC ........ H01R 13/05; H01R 13/08; H01R 13/11; H01R 13/15; H01R 13/17; H01R 13/18; H01R 13/187; H01R 13/24; H01R 13/2407; H01R 13/2421; H01R 13/44; H01R 13/2428; G06F 13/4081; G06F 13/4068
USPC .................. 710/100–317; 439/135–150, 700
See application file for complete search history.

(56) References Cited

FOREIGN PATENT DOCUMENTS

| | | | |
|---|---|---|---|
| CN | 205121546 U | 3/2016 | |
| CN | 105680222 A | 6/2016 | |
| CN | 206041059 U | 3/2017 | |
| CN | 106970888 A | 7/2017 | |
| CN | 108615996 A | 10/2018 | |

* cited by examiner

PLUG, INTERFACE DEVICE AND IDENTIFICATION METHOD THEREOF

CROSS-REFERENCE

The present application claims priority of Chinese patent application No. 201810389332.1, filed on Apr. 26, 2018, the disclosure of which is incorporated herein by reference as part of the application.

TECHNICAL FIELD

The embodiments of the present disclosure relate to a plug, an interface device and an identification method thereof.

BACKGROUND

With the development of science and technology, application of electronic devices such as mobile phones is becoming more and more widespread. In general, the interface standards applicable to different kinds of electronic devices are different, which leads to the fact that, it is necessary to carefully distinguish the corresponding interface standard when charging or communicating with an electronic device, so as to avoid device failure or damage caused by an error in interface connection. In an environment that cannot be distinguished by human eyes, such as the dark environment, due to the inability to distinguish a corresponding interface standard, it is impossible to charge or communicate with an electronic device, which affects the usage of the electronic device.

SUMMARY

At least one embodiment of the present disclosure provides a plug for being plugged into a peripheral interface, the plug comprises at least one insulating pin row comprising a plurality of insulating pins, a conductive pin which is stretchable and retractable along an axis direction is provided on at least one side of a central line of each of the at least one insulating pin row, and the conductive pin is arranged between two adjacent insulating pins of the plurality of insulating pins.

For example, in the plug provided by at least one embodiment of the present disclosure, a plurality of conductive pins are provided, one of the plurality of conductive pins is provided between every adjacent two insulating pins of the plurality of insulating pins.

For example, in the plug provided by at least one embodiment of the present disclosure, an outer surface of the conductive pin respectively abuts against outer surfaces of the insulating pins that are adjacent to the conductive pin.

For example, in the plug provided by at least one embodiment of the present disclosure, an interval of the conductive pins that are adjacent is equal to an interval of adjacent electric contacts of a corresponding peripheral interface.

For example, in the plug provided by at least one embodiment of the present disclosure, outer surfaces of the insulating pins that are adjacent abut against each other, and an outer diameter of a cross-section of the insulating pin is greater than an outer diameter of a cross-section of the conductive pin.

For example, the plug provided by at least one embodiment of the present disclosure further comprises a housing, an opposite end of an insertion end of the conductive pin and an opposite end of an insertion end of each of the plurality of insulating pins are arranged in the housing, under a condition that the plug is not inserted into the peripheral interface, the conductive pin retracts into the housing along the axis direction, and under a condition that the plug is inserted into the peripheral interface, the conductive pin stretches out along the axis direction.

For example, in the plug provided by at least one embodiment of the present disclosure, the insulating pin is stretchable and retractable along the axis direction, the plug is provided with at least one external insulating pin at a position corresponding to a periphery of the peripheral interface, and the at least one external insulating pin is connected to the conductive pin through a linkage mechanism, under a condition that the plug is not inserted into the peripheral interface, the conductive pin is in a state of axial retraction, under a condition that the plug is inserted into the peripheral interface, the external insulating pin at the position corresponding to the periphery of the peripheral interface is compressed and retracts, and the conductive pin stretches out under an action of the linkage mechanism.

For example, in the plug provided by at least one embodiment of the present disclosure, the plug further comprises a first fixing pedestal, the first fixing pedestal has a first receptive cavity, the conductive pin comprises a needle portion at a top position and a step pillar at a bottom position, and the step pillar is in the first receptive cavity, the plug further comprises a second fixing pedestal, the second fixing pedestal has a second receptive cavity, a bottom of the insulating pin is in the second receptive cavity, and a top of the insulating pin is outside the second fixing pedestal, the linkage mechanism comprises a first piston that is disposed below the step pillar and is slidable within the first receptive cavity, the linkage mechanism further comprises a second elastic component and a third elastic component, the second elastic component is between the step pillar and an internal top wall of the first receptive cavity, and the third elastic component is between the step pillar and the first piston; the linkage mechanism further comprises a second piston that is disposed below the insulating pins and is slidable within the second receptive cavity, and comprises a fourth elastic component between the second piston and the insulating pins, the linkage mechanism further comprises a link rod and a rotating shaft on the link rod, the link rod is rotatable around the rotating shaft, and two ends of the link rod respectively abut against the first piston and the second piston.

For example, in the plug provided by at least one embodiment of the present disclosure, each of the insulating pins corresponds to a recessed region of the peripheral interface, the plug further comprises a first fixing pedestal, the first fixing pedestal has a first receptive cavity, the conductive pin comprises a needle portion at a top position and a step pillar at a bottom position, and the step pillar is in the first receptive cavity, the plug further comprises a first elastic component and a snap-fit member, and the first elastic component is between a bottom wall of the first receptive cavity and the step pillar, an engaging component is provided on an outer surface of the step pillar and is in snap-fit connection with the snap-fit member, and the snap-fit member is controllable, so that the snap-fit member is switchable between snap-fit connection with the engaging component and detaching from the engaging component.

For example, in the plug provided by at least one embodiment of the present disclosure, the snap-fit member is a toggle button that is capable of being toggled along a radial direction of the conductive pin, and the engaging component is a groove on the outer surface of the step pillar and being in snap-fit connection with the toggle button.

For example, in the plug provided by at least one embodiment of the present disclosure, the plug comprises a plurality of insulating pin rows, the insulating pins are stretchable and retractable along the axis direction, and the conductive pin is arranged in a gap between the insulating pins that are adjacent.

For example, in the plug provided by at least one embodiment of the present disclosure, a cross-section of the insulating pin is in a circle shape or a polygon shape; and a cross-section of the conductive pin is in a circle shape or a polygon shape.

At least one embodiment of the present disclosure provides an interface device, which comprises any one of the above plugs, and further comprises an identification circuit, the identification circuit comprises a detection contact and a communication contact, and each of the plurality of conductive pins is electrically connected with the detection contact.

For example, the interface device provided by at least one embodiment of the present disclosure further comprises a detection unit for detecting whether the plug is connected to the peripheral interface.

For example, in the interface device provided by at least one embodiment of the present disclosure, the detection unit detects whether the plug is connected to the peripheral interface according to a change of a parameter of the detection contact.

For example, the interface device provided by at least one embodiment of the present disclosure further comprises an acquisition unit for acquiring the parameter of the detection contact; a determination unit for determining an interface standard of the peripheral interface according to the parameter of the detection contact; and a configuration unit for configuring the conductive pin to be electrically connected with a corresponding communication contact in the identification circuit according to the interface standard of the peripheral interface.

At least one embodiment of the present disclosure provides an identification method of an interface device, the interface device comprises any one of the above plugs, and further comprises an identification circuit, the identification circuit comprises a detection contact and a communication contact, each of the plurality of conductive pins is electrically connected to the detection contact, and the identification method comprises: detecting whether the plug is connected to the peripheral interface, and under a condition that it is detected that the plug is connected to the peripheral interface, electrically connecting the conductive pin to a corresponding communication contact in the identification circuit.

For example, in the identification method provided by at least one embodiment of the present disclosure, whether the plug is connected to the peripheral interface is detected according to a change of a parameter of the detection contact.

For example, in the identification method provided by at least one embodiment of the present disclosure, under a condition that it is detected that the plug is connected to the peripheral interface, the identification method further comprises: acquiring the parameter of the detection contact; determining an interface standard of the peripheral interface according to the parameter of the detection contact; and configuring the conductive pin to be electrically connected with a corresponding communication contact in the identification circuit according to the interface standard of the peripheral interface.

For example, in the identification method provided by at least one embodiment of the present disclosure, the determining the interface standard according to the parameter of the detection contact comprises: determining an electric contact number of the peripheral interface according to the parameter of the detection contact; searching an electric contact definition that corresponds to the parameter of the detection contact by using a corresponding relationship between the parameter and the electric contact definition; determining an electric contact sequence according to the electric contact definition; and determining the interface standard of the peripheral interface according to the electric contact number, the electric contact definition and the electric contact sequence.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

FIG. 6b is a schematic view where the conductive pins stretch out and contact with electric contacts after FIG. 6a;

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "on," "under," "left," "right," or the like are only used to indicate relative position relationship, and when the position of the object which is described is changed, the relative position relationship may be changed accordingly.

Hereinafter, a plug, an interface device and an identification method thereof provided by embodiments of the present disclosure will be described in detail with reference to the attached drawings.

Figure 1:
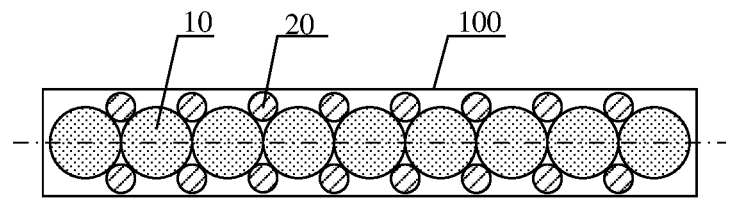
FIG. 1 is a schematically structural top view of a plug provided by at least one embodiment of the present disclosure.
Figure 2:
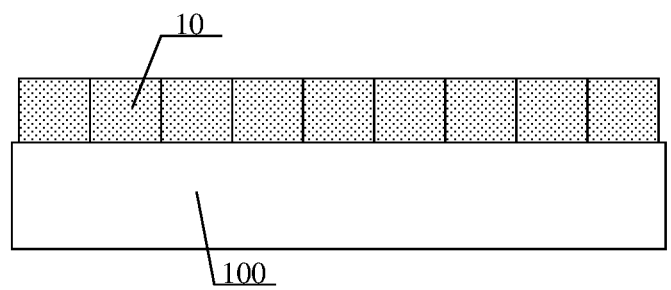
FIG. 2 is a schematically structural side view of the plug shown in FIG. 1.
Figure 3:
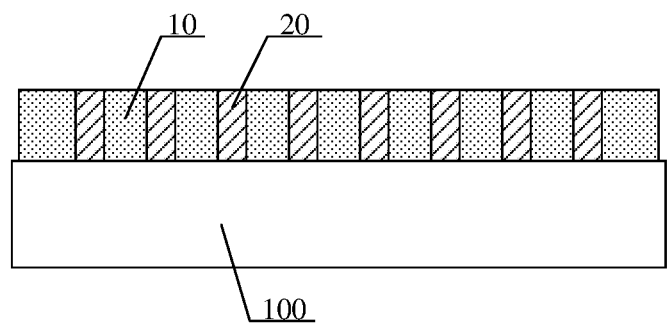
FIG. 3 is a schematically structural view of the plug shown in FIG. 1 after conductive pins of the plug stretch out.

FIG. 1 is a schematically structural top view of a plug provided by at least one embodiment of the present disclosure. FIG. 2 is a schematically structural side view of the plug shown in FIG. 1. FIG. 3 is a schematically structural view of the plug shown in FIG. 1 after conductive pins of the plug in FIG. 2 stretch out. With reference to FIG. 1, FIG. 2 and FIG. 3, a plug provided by the embodiment may, for example, be configured on an interface device, and be used to be plugged into a peripheral interface, such as a data interface of a peripheral device. The plug includes at least one insulating pin row including a plurality of insulating pins 10, the insulating pins 10 are stretchable and retractable along an axis direction, and a conductive pin 20 which is stretchable and retractable along an axis direction is provided on at least one side of a central line of each of the at least one insulating pin row, and is arranged between two adjacent insulating pins 10 of the plurality of insulating pins 10.

For example, a plurality of conductive pins 20 are provided, and one of the plurality of conductive pins 20 is arranged between every adjacent two insulating pins 10 of the plurality of insulating pins. For example, an outer surface of the conductive pin 20 respectively abuts against outer surfaces of insulating pins 10 that are adjacent to the conductive pin 20.

Regarding the plug provided by the embodiment, by setting the conductive pins 20 of the plug to be stretchable and retractable along an axis direction, in an environment that is indistinguishable by human eyes, such as an dark environment, where the plug is inserted into a data interface of an unknown interface standard, the conductive pins stretch out and are electrically connected with electric contacts at positions of the electric contacts, and the conductive pins retract under pressure at positions of no electric contact. In some examples, one conductive pin 20 is provided between every two adjacent insulating pins 10, so that each electric contact on the data interface can be electrically connected with a corresponding conductive pin, and omission of electric contact is avoided. By means of allowing the outer surface of conductive pin 20 to respectively abut against outer surfaces of insulating pins 10 that are adjacent to the conductive pins 20, the insulating pins 10 can laterally apply a certain force on the conductive pins 20 and thus allow the conductive pins to fully contact the electric contacts. This avoids false connection between the conductive pins and the electric contacts, and correct electrical contact between the plug and a data interface of an unknown interface standard in an environment that is indistinguishable by human eyes, such as the dark environment, is realized.

For example, as shown in FIG. 3, after the conductive pins 20 stretch out, tops of the conductive pins 20 are flush with tops of the insulating pins 10, but it is understandable that, after the conductive pins 20 stretch out, the tops of the conductive pins 20 may also be higher or lower than the tops of the insulating pins 10, as long as the conductive pins 20 can be in contact with the electric contacts of the data interface after the conductive pins 20 stretch out.

In general, USB, lightning interface standard and so on are employed as common interface standards of data interface on electronic devices, such as mobile phones. The distances between adjacent electric contacts of these data interfaces are equal, but because these data interfaces adopt different interface standards, the definition of each of corresponding electric contacts is different. Therefore, when charging or communicating with these electronic devices, it is necessary to carefully distinguish interface standards corresponding to the data interfaces, so as to select an appropriate plug.

The plug provided by the embodiment can be available to common interface standards of a corresponding data interface. For example, in the plug provided by the embodiment, an interval of adjacent conductive pins is equal to an interval of adjacent electric contacts of a corresponding data interface, and the insulating pins are arranged according to the positions and structures of the conductive pins. Thus, the plug provided by the embodiment can be applied to common interface standards of a corresponding data interface, as long as the electronic device has a corresponding data interface, the plug provided by the embodiment can be plugged into the data interface, and the conductive pins of the plug are in correct contact with the electric contacts of the data interface. For example, where the data interface of a mobile phone adopts the USB interface standard, because the USB interface standard belongs to the interface standards of the data interface corresponding to the plug, the plug provided by the embodiment can be inserted into the data interface of the mobile phone. For example, where the data interface of a mobile phone adopts the lightning interface standard, because the lightning interface standard belongs to the interface standards of the data interface corresponding to the plug, the plug provided by the embodiment can be inserted into the data interface of the mobile phone, so as to realize the contact between corresponding conductive pins and the electric contacts of the data interface of the mobile phone.

It is understandable that, the plug of an interface device is usually charged, and in order to ensure usage safety of the plug, for example, the plug further includes a housing 100 arranged on a side of the plug opposed to a plug insertion end, and a bottom end (that is, an opposite end of an insertion end) of each of the conductive pins 20 and a bottom end of each of the insulating pins 10 are arranged in the housing 100. It is understandable that, the insertion ends of the conductive pins and the insulating pins are the ends that are inserted into the data interface, the insertion ends are shown as the top ends in FIG. 3, and the opposite ends of the insertion ends are shown as the bottom ends in FIG. 3. It can be seen from FIG. 3 that, the bottom ends of the conductive pins 20 and the insulating pins 10 are arranged in the housing 100. Where the plug is not inserted into a data interface, the conductive pins 20 are retracted axially in the housing 100, as shown in FIG. 2, and where the plug is inserted into the data interface, the conductive pins 20 stretch out axially and contact the corresponding electric contacts, as shown in FIG. 3.

Regarding the plug provided by the embodiment, where the plug is not plugged into a data interface, the conductive pins 20 are retracted axially in the housing 100, and cannot cause danger of electric shock to the users, thereby ensuring usage safety of the plug. Moreover, damage caused by an external force to the conductive pins 20 can also be avoided, thus playing a protective function on the conductive pins 20.

For example, in this embodiment, as shown in FIG. 1, outer surfaces of adjacent insulating pins 10 abut against each other, and an outer diameter of a cross-section of the insulating pin 10 is larger than an outer diameter of a cross-section of the conductive pin 20. Thus, it is ensured that the insulating pins 10 and the conductive pins 20 can be accurately aligned in the process of stretching and retracting, and the following case is avoided: the conductive pins 20 shift after the conductive pins 20 are used for many times, and the conductive pins 20 cannot be in good contact with the electric contacts of the data interface.

For example, as shown in FIG. 1, a cross-section the conductive pin 20 is in a circle shape, and a cross-section of the insulating pin 10 is also in a circle shape. It is understandable that in other embodiments, a cross-section of the conductive pin 20 may also be in a polygon shape or other shape, and a cross-section of the insulating pin 10 may also be in a polygon or other shape, as long as demands can be met.

Figure 4:
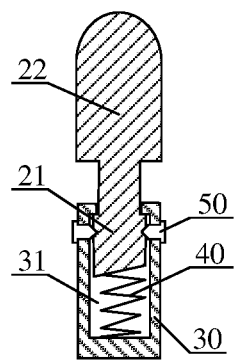
FIG. 4 is a schematically structural view of an axial section of a conductive pin in FIG. 1.

For example, FIG. 4 is a schematically structural view illustrating the axial section of a conductive pin in FIG. 1. For example, as shown in FIG. 4, the plug further includes a first fixing pedestal 30 arranged in the housing, the first fixing pedestal 30 has a first receptive cavity 31, and the conductive pin 20 includes a needle portion 22 at a top position and a step pillar 21 at a bottom position, the step pillar 21 is in the first receptive cavity 31. For example, the plug further includes a first elastic component 40 that is compressible between a bottom wall of the first receptive cavity 31 and the step pillar 21.

Figure 5:
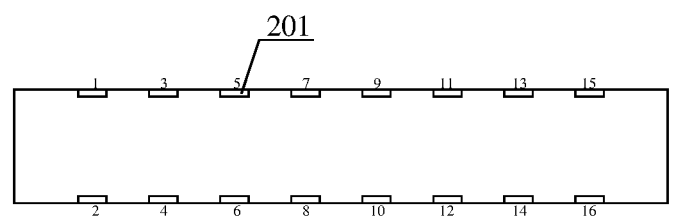
FIG. 5 is a data interface commonly used in mobile phones.

For example, in the present daily life, the commonly used electronic device is a mobile phone, and FIG. 5 is a common data interface of the mobile phone. The data interface in FIG. 5 is available to common interface standards of the data interface of the mobile phone. In FIG. 5, a recessed region is generally exits between upper electric contacts and lower electric contacts of the data interface, and it is understandable that, in real life, the data interface of a mobile phone does not necessarily have 16 electric contacts, and in general, the data interface has some of the electric contacts in FIG. 5 according to the interface standard. Therefore, in order to facilitate charging or communication with the mobile phone, as shown in FIG. 1, the interface device in the present embodiment includes an insulating pin row, and the upper side and the lower side of a central line of the insulating pin row are both provided with the conductive pins 20. Thus, all interface standards of existing mobile phones can be realized.

For example, in the embodiment, where the plug is inserted into the data interface shown in FIG. 5, all of the insulating pins 10 are located in the recessed region of the data interface, that is, no insulating pin 10 is compressed. Because the conductive pins 20 are retracted in the housing 100, in order to allow the conductive pins to stretch out, for example, the plug further includes a snap-fit member, and an engaging component is provided on an outer surface of the step pillar 21, the engaging component is in snap-fit connection with the snap-fit member. The snap-fit member is controllable, so that the snap-fit member can switch between snap-fit connection with the engaging component and detaching from the engaging component.

For example, in one example, as shown in FIG. 4, the snap-fit member is a toggle button 50 that is capable of being toggled along a radial direction of the conductive pin, and a groove is provided on the outer surface of the step pillar 21 to be in snap-fit connection with the toggle button 50. The conductive pin can be manually controlled to stretch out or retract under the cooperation of the toggle button 50 and the first elastic component 40. For example, where the plug is inserted into the data interface, the toggle button 50 is toggled manually, so that the conductive pin stretches out and contacts an electric contact of the data interface. After the plug is detached from the data interface, the toggle button 50 is toggled manually, so that the conductive pin retracts. For illustration, FIG. 4 shows one conductive pin, and meanwhile shows one toggle button 50. It is understandable that in some examples, the toggle button for each of the conductive pins may be an integral structure, so that where the toggle button is toggled, all the conductive pins can stretch out or retract.

It is understandable that in some examples, the holding force of the toggle button may be set reasonably, so that where the toggle button is toggled to cause the conductive pins to stretch out, the conductive pin in the position corresponding to an electric contact can stretch out and be in contact with the electric contact, and in the position where there is no electric contact, an external force applying on the conductive pin is greater than the holding force of the toggle button, so as to avoid the conductive pin from stretching out.

In the embodiment, the snap-fit member and the engaging component may be in any forms, as long as the snap-fit member and the engaging component can control the stretching and retracting of the conductive pins. For example, in other examples, the snap-fit member may be a snap-fit head that can stretch out along a radial direction of the conductive pin, and an engaging sleeve that matches with the snap-fit head is provided on the outer surface of the step pillar, the snap-fit head can reach into the engaging sleeve to achieve a snap-fit connection. Thus, the conductive pin can be manually controlled to stretch out or retract under the cooperation of the snap-fit head and the first elastic component.

For example, in the embodiment, all of the insulating pins correspond to the recessed region of the data interface, and therefore the insulating pins in the embodiment may be stretchable and retractable in the axial direction, and may also be not stretchable and retractable in the axial direction and maintain inconstant positions.

Figure 6A:
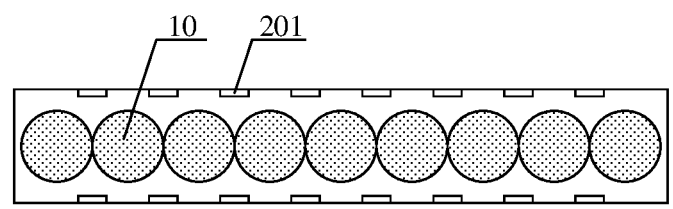
FIG. 6a is a schematic view where a plug provided by at least one embodiment of the present disclosure finds the data interface position.
Figure 6B:
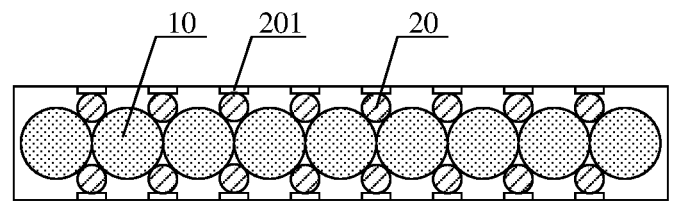

For example, FIG. 6a is a schematic diagram of the plug provided by the embodiment where the plug finds the location of the data interface, and FIG. 6b is a schematic diagram illustrating the case where conductive pins stretch out to contact with electric contacts after FIG. 6a. With reference to FIG. 6a and FIG. 6b, the connecting process of the plug provided by the embodiment and the data interface shown in FIG. 5 is as follows: in the dark environment, the position of the data interface of a mobile phone is determined roughly by touch, the plug is inserted toward the data interface position, because there is a recessed region between upper electric contacts and lower electric contacts of the data interface, the insulating pins are all inserted into the recessed region of the data interface, as shown in FIG. 6a, the toggle button is toggled manually to allow the conductive pins to stretch out and contact with the electric contacts, as shown in FIG. 6b, thereby realizing the connection of the plug and the data interface.

Figure 7:
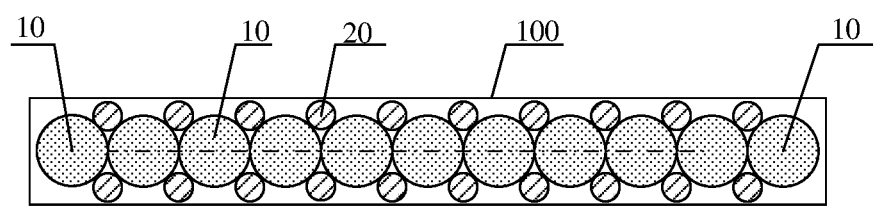
FIG. 7 is a schematically structural top view of another plug provided by at least one embodiment of the present disclosure.
Figure 8:
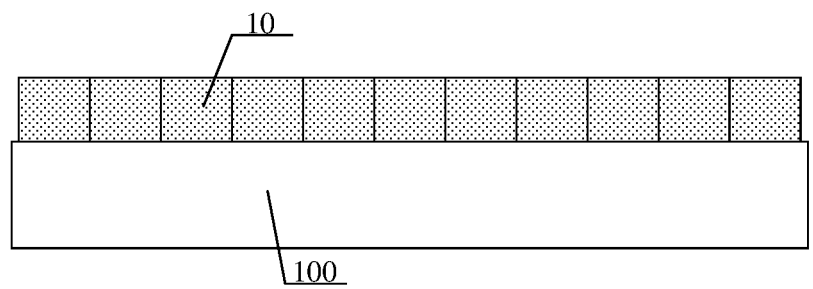
FIG. 8 is a schematically structural side view of the plug in FIG. 7.
Figure 9:
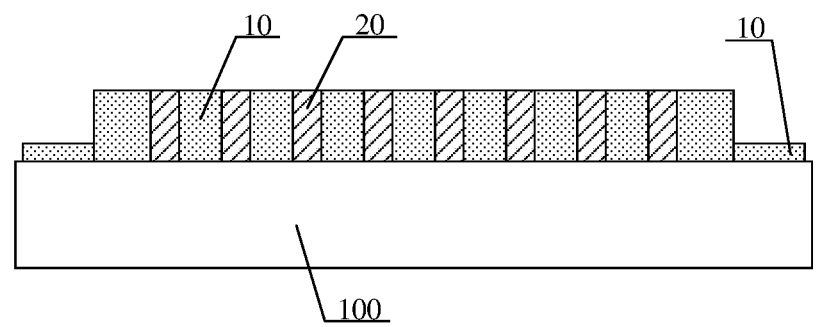
FIG. 9 is a schematically structural view of the plug shown in FIG. 8 after conductive pins of the plug in FIG. 8 stretch out.

FIG. 7 is a schematically structural top view of another plug provided by at least one embodiment of the present disclosure. FIG. 8 is a schematically structural side view of the plug in FIG. 7. FIG. 9 is a schematically structural view of the plug shown in FIG. 8 after conductive pins of the plug in FIG. 8 stretch out. Referring to FIG. 7, FIG. 8 and FIG. 9, the plug of the present embodiment differs from the above embodiment in that, in the present embodiment, the plug further comprises at least one insulating pin 10 (that is, at least one external insulating pin) at a position corresponding to the periphery of a peripheral interface (e.g., the data interface of a peripheral device), and the at least one external insulating pin 10 and the conductive pins 20 are connected through a linkage mechanism that is arranged in the housing 100. Where the plug is not inserted into the data interface, the conductive pins 20 are in an axial retraction state and retract axially in the housing 100, as shown in FIG. 8, and where the top of the at least one external insulating pin 10 is compressed and retracts, under the action of the linkage mechanism, the conductive pins 20 stretch out of the housing 100, as shown in FIG. 9.

Regarding the plug provided by the present embodiment, where the plug is inserted into a data interface, because the periphery of the data interface is the outer surface of an electronic device, the insulating pin 10 corresponding to the periphery of the data interface will be compressed by the outer surface of the electronic device, and under the action of the linkage mechanism, the conductive pins 20 automatically stretch out of the housing 100 to contact the electric contacts of the data interface.

Figure 10:
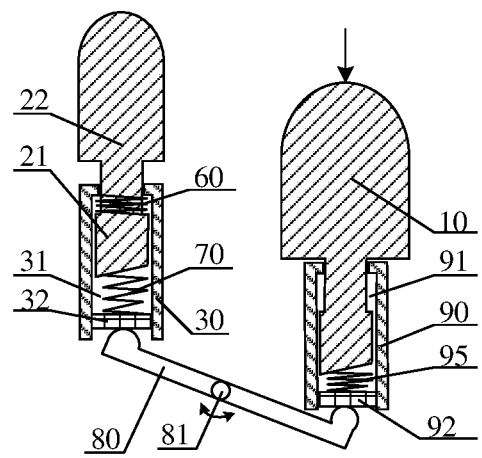
FIG. 10 is a schematic view illustrating the status of a linkage mechanism where a plug provided by at least one embodiment of the present disclosure is inserted into a data interface.

For example, FIG. 10 is a schematic diagram illustrating the status of the linkage mechanism where the plug is inserted into a data interface. For example, as shown in FIG. 10, the plug further includes a first fixing pedestal 30 and a second fixing pedestal 90, the conductive pin 20 is arranged on the first fixing pedestal 30, and the insulating pin 10 is arranged on the second fixing pedestal 90. The first fixing pedestal 30 has a first receptive cavity 31, the bottom end of the first the receptive cavity 31 has an opening. The conductive pin 20 includes a needle portion 22 at the top position and a step pillar 21 at the bottom position. The step pillar 21 is located in the first receptive cavity 31, and the needle portion 22 stretches out of the first fixing pedestal 30. The second fixing pedestal 90 has a second receptive cavity 91, the bottom of the insulating pin 20 is arranged in the second receptive cavity 91, and the top of the insulating pin 20 is arranged outside the second fixing pedestal 90.

For example, the linkage mechanism includes a first piston 32 that is disposed below the step pillar 21 and can slide within the first receptive cavity 31, the linkage mechanism further includes a second elastic component 60 and a third elastic component 70 that are compressible, the second elastic component 60 is between the step pillar 21 and an internal top wall of the first receptive cavity 31, and the third elastic component 70 is between the step pillar 21 and the first piston 32. For example, the linkage mechanism further includes a second piston 92, which is arranged below the insulating pin 10 and can slide within the second receptive cavity 91, and includes a fourth elastic component 95 that is compressible, the fourth elastic component 95 is arranged between the second piston 92 and the insulating pin 10. For example, the linkage mechanism further includes a link rod 80 and a rotating shaft 81 arranged on the link rod 80, and the link rod 80 is rotatable around the rotating shaft 81. Two ends of the link rod 80 respectively abut against the first piston 32 and the second piston 92. For example, the second elastic component, the third elastic component and the fourth elastic component may be springs or other elastic components.

Referring to FIG. 10, the operating principle of the linkage mechanism is as follows: where the plug is inserted into a data interface, the insulating pin 10 corresponding to the periphery of the data interface moves downward by an external force, the bottom end of the insulating pin 10 acts on the fourth elastic component 95, the fourth elastic component 95 is compressed and pushes the second piston 92 to move downward, so as to push a right end of the link rod 80 to allow the link rod 80 to rotate clockwise around the rotating shaft 81, so that a left end of the link rod 80 pushes the piston 32 upward, and under the push of the piston 32, the conductive pin 20 moves upward to stretch out and gets in contact with the electric contact of the data interface, thereby realizing connection of the plug to the data interface. Where the plug is detached from the data interface, under the action of the second elastic component 60 and the third elastic component 70, the link rod 80 rotates counterclockwise and returns to its initial position, the conductive pin 20 retracts into the housing, and the insulating pin 10 moves upward and returns to its initial position, whereby the plug is detached from the data interface.

Figure 11:
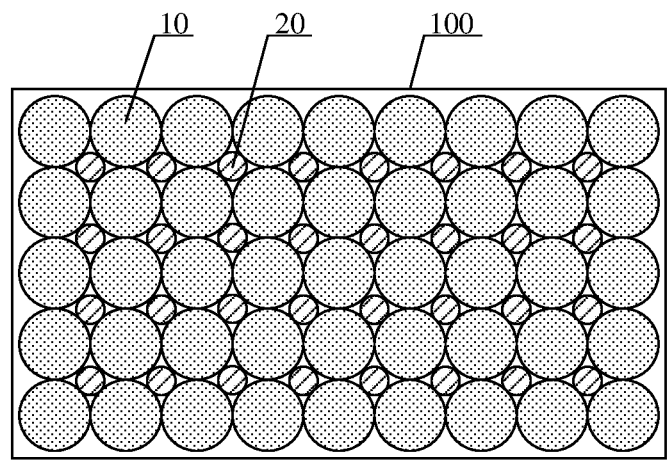
FIG. 11 is a schematically structural top view of further another plug provided by at least one embodiment of the present disclosure.

For example, FIG. 11 is a schematically structural top view of further another plug provided by at least one embodiment of the present disclosure. As shown in FIG. 11, the plug provided by the present embodiment differs from the above embodiment in that, in the present embodiment, the plug includes a plurality of insulating pin rows, and between every two adjacent insulating pin rows of the plurality of insulating pin rows, there is provided a conductive pin 20, that is, the conductive pin 20 is arranged in a gap between two adjacent insulating pins 10, so that the insulating pins can stabilize the position of the conductive pins better.

Regarding the plug provided by the present embodiment, no matter what the array number of electric contacts of the data interface is, the plug can be inserted into a corresponding peripheral interface, such as the data interface of a peripheral device, and all the insulating pins and the conductive pins can stretch out or retract according to corresponding positions, so that the application scope of the plug can be expanded. Furthermore, after the plug is used for many times, the conductive pins will not suffer from positional offset, and thus the electrical performance of the plug can be improved.

At least one embodiment of the present disclosure further provide an interface device, the interface device includes the plug provided by the above embodiments. For example, the interface device further includes an identification circuit and an identification module, the conductive pins can be electrically connected to the identification circuit, and the identification module is used for identifying interface standard of a peripheral interface, such as the data interface of a peripheral device, so that the interface device can communicate with an electronic device.

Figure 12:
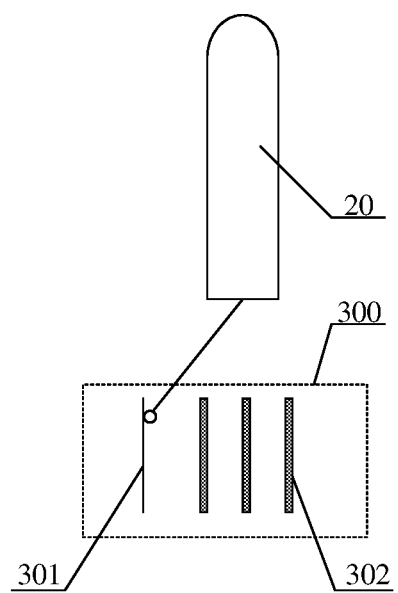
FIG. 12 is a schematic view illustrating a connection of an identification circuit to a conductive pin provided by at least one embodiment of the present disclosure.

For example, FIG. 12 is a schematic diagram illustrating a connection of an identification circuit and conductive pins provided by at least one embodiment of the present disclosure. The interface device further includes an identification circuit 300 and an identification module, each conductive pin is electrically connected to the identification circuit, the identification module is used for identifying the interface standard of the data interface through the identification circuit 300, so that the interface device can communicate with an electronic device.

For example, as shown in FIG. 12, the identification circuit 300 includes a detection contact 301 and a plurality of communication contacts 302, and each of the conductive pins is electrically connected to the detection contact 301 where the plug is not inserted into the data interface.

Figure 13:
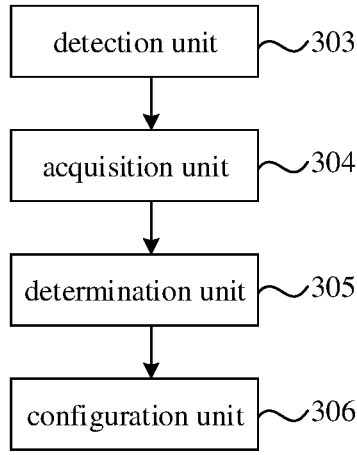
FIG. 13 is a schematically structural view illustrating an identification module provided by at least one embodiment of the present disclosure.

For example, FIG. 13 is a schematically structural view of an identification module provided by at least one embodiment of the present disclosure, and as shown in FIG. 13, the identification module includes a detection unit 303, an acquisition unit 304, a determination unit 305 and a configuration unit 306.

For example, the detection unit 303 is used to detect whether the plug is connected to a data interface. For example, the detection unit 303 detects whether the plug is connected to a peripheral interface according to a change of a parameter of the detection contact. Where the plug of the interface device is not inserted into a data interface, each of the detection contacts has the same parameter. Where the plug is inserted into a data interface, the parameter of the detection contact changes, and the detection unit can detect whether the plug is connected to the data interface according to the change. It is understandable that, the parameter of the detecting contact may be a voltage parameter, a current parameter, etc.

For example, the acquisition unit 304 is used to acquire the parameter of the detection contact.

For example, the determination unit 305 is used for determining the interface standard of the data interface according to the parameter of the detection contact. Specifically, determining the interface standard of the data interface according to the parameter of detection contact includes: determining the electric contact number of the data interface according to the parameter of the detection contact; searching an electric contact definition corresponding to the parameter of the detection contact by using a corresponding relationship between the parameter and the electric contact definition; determining an electric contact sequence according to the electric contact definition; and determining the interface standard of the data interface according to the electric contact number, the electric contact definition and the electric contact sequence.

For example, electric contacts of a data interface are VCC, DATA−, DATA+ and GND, respectively, and parameters of detection contacts that correspond to the conductive pins respectively in contact with the VCC, DATA−, DATA+ and GND are different. For example, where the conductive pins respectively contact the VCC, DATA−, DATA+ and GND, the parameters of the detection contacts are V1, V2, V3 and V4, respectively. If the parameters of the detection contacts obtained by the acquisition unit are V1, V2, V3 and V4, respectively, the electric contact number is determined to be 4 according to the parameters of the detection contacts. By using a corresponding relationship between the parameters and the electric contact definitions, it is found that the electric contact definitions corresponding to the parameters V1, V2, V3 and V4 are VCC, DATA−, DATA+, GND, respectively, and the electric contact sequence is determined to be VCC, DATA−, DATA+, GND. Thus, the interface standard of the data interface is determined to be USB according to the electric contact number, the electric contact definitions and the electric contact sequence.

For example, in another example, in addition to VCC, DATA−, DATA+ and GND, electric contacts of the data interface may further include an ID electric contact, so as to identify different connecting devices. For example, the ID electric contact indicates different devices where the ID electric contact is in a suspending state or a grounding state, so that the interface device can also identify different devices by means of identifying the parameter of the ID electric contact. For example, where the conductive pins respectively contact the VCC, DATA−, DATA+, GND and ID, parameters of the detection contacts are V1, V2, V3, V4 and V5, respectively. If the parameters of the detection contacts obtained by the acquisition unit are V1, V2, V3, V4 and V5, respectively, the electric contact number is determined to be 5 according to the parameters of the detection contacts. By using a corresponding relationship between the parameters and the electrical contact definitions, it is found that the electric contact definitions corresponding to the parameters V1, V2, V3, V4 and V5 are VCC, DATA−, DATA+, GND and ID, respectively, and the electric contact sequence is determined to be VCC, DATA−, DATA+, GND and ID. Thus, the interface standard of the data interface is determined to be USB of a corresponding device according to the electric contact number, the electric contact definitions and the electric contact sequence.

For example, the configuration unit 306 is used for configuring the conductive pin to be electrically connected to a corresponding communication contact in the identification circuit according to the interface standard of the data interface, so that the interface device can communicate with an electronic device. For example, after it is determined by the determination unit that the interface standard of the data interface is USB, the conductive pins in contact with the electric contacts are configured to be electrically connected to the corresponding communication contacts of the identification circuit. Thus, a communication connection is achieved between the interface device and the electronic device, and the interface device can communicate with the electronic device.

Regarding the interface device provided by the embodiment, by providing the identification circuit and the identification module, and the identification module identifies the interface standard of the data interface through the identification circuit, so that the interface device can communicate with an electronic device, and an automatic communication connection between the interface device and a data interface of an unknown interface standard in an environment that cannot be distinguished by human eyes, such as a dark environment, is achieved. As a result, the identification and connection of an electronic device, such as a mobile phone or the like, can be realized more conveniently, and the charging and data connection of the electronic device is realized quickly.

At least one embodiment of the present disclosure further provide an intelligent speaker base, the intelligent speaker base comprises the interface device in the above embodiments.

At least one embodiment of the present disclosure further provide an identification method of an interface device, the interface device includes the plug in the above embodiments.

For example, the interface device further includes an identification circuit, and each of the conductive pins is electrically connected to the identification circuit. For example, the identification circuit includes a detection contact and a plurality of communication contacts. Where the plug is not inserted into a data interface, the conductive pins are all electrically connected to the detection contact.

For example, in one embodiment, the identification method includes: detecting whether the plug is connected to a peripheral interface, such as a data interface of a peripheral device, and where the plug is detected to be connected with the peripheral interface, electrically connecting the conductive pins to corresponding communication contacts in the identification circuit. For example, whether the plug is connected to a data interface is detected according to a parameter change of the detection contact.

Figure 14:
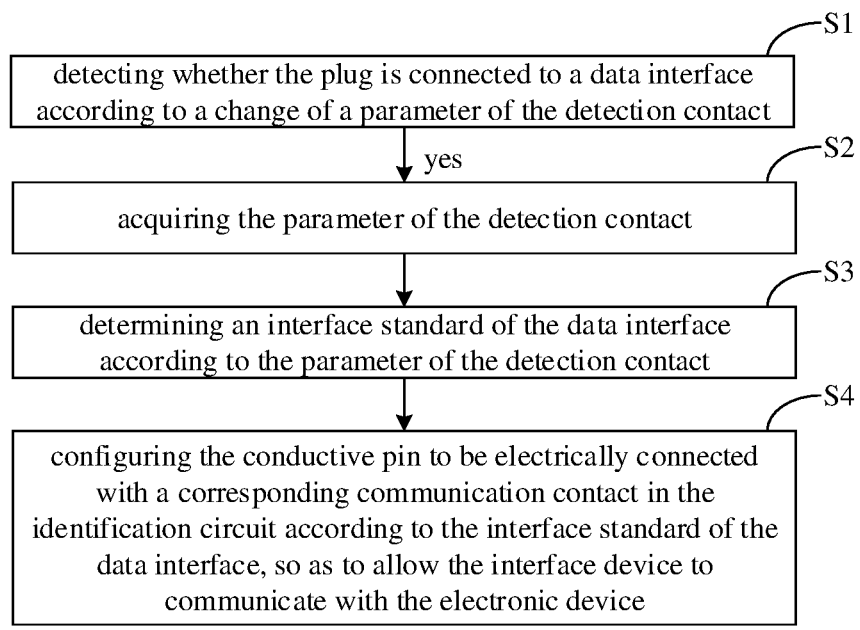
FIG. 14 is a schematic view illustrating an identification method provided by at least one embodiment of the present disclosure.

For example, in another embodiment, FIG. 14 is a schematic diagram of an identification method provided by the embodiment, the identification method includes:

S1: detecting whether the plug is connected to a data interface according to a change of a parameter of the detection contact; where the plug is detected to be connected to the data interface, the identification method further includes:

S2: acquiring the parameter of the detection contact;

S3: determining an interface standard of the data interface according to the parameter of the detection contact;

S4: configuring the conductive pin to be connected to a corresponding communication contact in the identification circuit according to the interface standard of the data interface, so as to allow the interface device to communicate with the electronic device.

For example, where it is detected that the plug is not connected to a data interface, the detection proceeds until it is detected that the plug is connected to the data interface, and then the steps S2 to S4 are performed.

For example, in the step S3, determining the interface standard of the data interface according to the parameter of the detection contact may include:

Determining an electric contact number of the data interface according to the parameter of the detection contact;

Searching an electric contact definition corresponding to the parameter of the detection contact by using a corresponding relationship between the parameter and the electric contact definition;

Determining an electric contact sequence according to the electric contact definition;

Determining the interface standard of the data interface according to the electric contact number, the electric contact definition and the electric contact sequence.

By using the identification method provided by the embodiment, automatic communication connection between the interface device and a data interface of an unknown interface standard in an environment that cannot be distinguished by human eyes, such as a dark environment, can be achieved. As a result, the identification and connection of an electronic device, such as a mobile phone or the like, can be realized more conveniently, and the charging and data connection of the electronic device is realized quickly.

It should be noted that, as understandable by those ordinarily skilled in the art, all or some of the steps in the method, system, and functional modules/components in the device disclosed above may be implemented as software, firmware, hardware or their appropriate combinations. In a hardware embodiment, the division of functional modules/components mentioned above does not necessarily correspond to the division of physical components; for example, one physical component may have multiple functions, or one function or step may be performed in cooperation by several physical components. Some or all of the components may be implemented as software executed by a processor, such as digital signal processor or microprocessor, or be implemented as hardware, or be implemented as an integrated circuit, such as a special-purpose integrated circuit. Such software may be distributed on computer-readable media, which may include computer storage media (or non-temporary media) and communication media (or temporary media). As well known to those ordinarily skilled in the art, the term "computer storage medium" includes volatile and non-volatile, removable and non-removable media implemented in any method or technology used to store information, such as computer-readable instructions, data structures, program modules, or other data. Computer storage medium includes, but is not limited to, RAM, ROM, EEPROM, flash memory or other memory technologies, CD-ROM, digital versatile disk (DVD) or other optical disk storages, magnetic cassette, magnetic tape, magnetic disk storage or other magnetic storage device, or any other medium that can be used to store the desired information and can be accessed by computer. In addition, it is well known to those ordinarily skilled in the art that, communication media usually contain computer-readable instructions, data structures, program modules or other data in modulating data signals such as carriers or other transmission mechanisms, and may include any information delivery medium.

The following several statements should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced. That is, the drawings are not drawn in actual scale.

(3) In case of no conflict, embodiments of the present disclosure and the features in the embodiments may be mutually combined to obtain new embodiments.

What are described above is related to the illustrative embodiments of the disclosure only and not limitative to the scope of the disclosure; the scopes of the disclosure are defined by the accompanying claims.

What is claimed is:

1. A plug, for being plugged into a peripheral interface, comprising at least one insulating pin row comprising a plurality of insulating pins, wherein a conductive pin which is stretchable and retractable along an axis direction is provided on at least one side of a first central line of each of the at least one insulating pin row, and the conductive pin is arranged between second central lines of two adjacent insulating pins of the plurality of insulating pins and is arranged outside the two adjacent insulating pins, the conductive pin is capable of moving to stretch out or retract, the first central line is perpendicular to the second central lines; and an outer surface of the conductive pin respectively abuts against outer surfaces of the insulating pins that are adjacent to the conductive pin.

2. The plug according to claim 1, wherein a plurality of conductive pins are provided, one of the plurality of conductive pins is provided between every adjacent two insulating pins of the plurality of insulating pins.

3. The plug according to claim 2, wherein an interval of the conductive pins that are adjacent is equal to an interval of adjacent electric contacts of a corresponding peripheral interface.

4. The plug according to claim 3, wherein outer surfaces of the insulating pins that are adjacent abut against each other, and an outer diameter of a cross-section of the insulating pin is greater than an outer diameter of a cross-section of the conductive pin.

5. The plug according to claim 1, further comprising a housing, wherein an opposite end of an insertion end of the conductive pin and an opposite end of an insertion end of each of the plurality of insulating pins are arranged in the housing,
under a condition that the plug is not inserted into the peripheral interface, the conductive pin retracts into the housing along the axis direction, and under a condition that the plug is inserted into the peripheral interface, the conductive pin stretches out along the axis direction.

6. The plug according to claim 1, wherein the insulating pin is stretchable and retractable along the axis direction, the plug is provided with at least one external insulating pin at a position corresponding to a periphery of the peripheral interface, and the at least one external insulating pin is connected to the conductive pin through a linkage mechanism,
under a condition that the plug is not inserted into the peripheral interface, the conductive pin is in a state of axial retraction, under a condition that the plug is inserted into the peripheral interface, the external insulating pin at the position corresponding to the periphery of the peripheral interface is compressed and retracts, and the conductive pin stretches out under an action of the linkage mechanism.

7. The plug according to claim 6, wherein the plug further comprises a first fixing pedestal, the first fixing pedestal has a first receptive cavity, the conductive pin comprises a needle portion at a top position and a step pillar at a bottom position, and the step pillar is in the first receptive cavity,
the plug further comprises a second fixing pedestal, the second fixing pedestal has a second receptive cavity, a bottom of the insulating pin is in the second receptive cavity, and a top of the insulating pin is outside the second fixing pedestal,
the linkage mechanism comprises a first piston that is disposed below the step pillar and is slidable within the first receptive cavity, the linkage mechanism further comprises a second elastic component and a third elastic component, the second elastic component is between the step pillar and an internal top wall of the first receptive cavity, and the third elastic component is between the step pillar and the first piston;
the linkage mechanism further comprises a second piston that is disposed below the insulating pins and is slidable within the second receptive cavity, and comprises a fourth elastic component between the second piston and the insulating pins,
the linkage mechanism further comprises a link rod and a rotating shaft on the link rod, the link rod is rotatable around the rotating shaft, and two ends of the link rod respectively abut against the first piston and the second piston.

8. The plug according to claim 1, wherein each of the insulating pins corresponds to a recessed region of the peripheral interface,
the plug further comprises a first fixing pedestal, the first fixing pedestal has a first receptive cavity, the conductive pin comprises a needle portion at a top position and a step pillar at a bottom position, and the step pillar is in the first receptive cavity,
the plug further comprises a first elastic component and a snap-fit member, and the first elastic component is between a bottom wall of the first receptive cavity and the step pillar, an engaging component is provided on an outer surface of the step pillar and is in snap-fit connection with the snap-fit member, and the snap-fit member is controllable, so that the snap-fit member is switchable between snap-fit connection with the engaging component and detaching from the engaging component.

9. The plug according to claim 8, wherein the snap-fit member is a toggle button that is capable of being toggled along a radial direction of the conductive pin, and the engaging component is a groove on the outer surface of the step pillar and being in snap-fit connection with the toggle button.

10. The plug according to claim 1, wherein the plug comprises a plurality of insulating pin rows, the insulating pins are stretchable and retractable along the axis direction, and the conductive pin is arranged in a gap between the insulating pins that are adjacent.

11. The plug according to claim 1, wherein a cross-section of the insulating pin is in a circle shape or a polygon shape; and a cross-section of the conductive pin is in a circle shape or a polygon shape.

12. An interface device, comprising the plug according to claim 1, further comprising an identification circuit, wherein the identification circuit comprises a detection contact and a communication contact, and each of the plurality of conductive pins is electrically connected with the detection contact.

13. The interface device according to claim 12, further comprising:
a detection unit, for detecting whether the plug is connected to the peripheral interface.

14. The interface device according to claim 13, wherein the detection unit detects whether the plug is connected to the peripheral interface according to a change of a parameter of the detection contact.

15. The interface device according to claim 14, further comprising:
an acquisition unit, for acquiring the parameter of the detection contact;
a determination unit, for determining an interface standard of the peripheral interface according to the parameter of the detection contact;
a configuration unit, for configuring the conductive pin to be electrically connected with a corresponding communication contact in the identification circuit according to the interface standard of the peripheral interface.

16. An identification method of an interface device, the interface device comprising the plug according to claim 1, further comprising an identification circuit, wherein the identification circuit comprises a detection contact and a communication contact, each of the plurality of conductive pins is electrically connected to the detection contact, and the identification method comprises:

detecting whether the plug is connected to the peripheral interface, and under a condition that it is detected that the plug is connected to the peripheral interface, electrically connecting the conductive pin to a corresponding communication contact in the identification circuit.

17. The identification method according to claim 16, wherein whether the plug is connected to the peripheral interface is detected according to a change of a parameter of the detection contact.

18. The identification method according to claim 17, wherein the determining the interface standard according to the parameter of the detection contact comprises:

determining an electric contact number of the peripheral interface according to the parameter of the detection contact;

searching an electric contact definition that corresponds to the parameter of the detection contact by using a corresponding relationship between the parameter and the electric contact definition;

determining an electric contact sequence according to the electric contact definition;

determining the interface standard of the peripheral interface according to the electric contact number, the electric contact definition and the electric contact sequence.

19. The identification method according to claim 16, wherein under a condition that it is detected that the plug is connected to the peripheral interface, the identification method further comprises:

acquiring the parameter of the detection contact;

determining an interface standard of the peripheral interface according to the parameter of the detection contact;

configuring the conductive pin to be electrically connected with a corresponding communication contact in the identification circuit according to the interface standard of the peripheral interface.

* * * * *